(12) United States Patent
Cooley et al.

(10) Patent No.: US 11,712,005 B2
(45) Date of Patent: Aug. 1, 2023

(54) AGRICULTURAL VEHICLE WITH CONTROLLER FOR DETERMINING SUFFICIENTLY SIZED BALE DROP ZONE

(71) Applicant: CNH Industrial America LLC, New Holland, PA (US)

(72) Inventors: Devin Cooley, Shillington, PA (US); Scott C. Simmons, Lititz, PA (US); Kevin M. Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 362 days.

(21) Appl. No.: 17/151,450

(22) Filed: Jan. 18, 2021

(65) Prior Publication Data

US 2022/0225573 A1 Jul. 21, 2022

(51) Int. Cl.
*A01F 15/08* (2006.01)
*A01B 69/04* (2006.01)

(52) U.S. Cl.
CPC ........ *A01F 15/0875* (2013.01); *A01B 69/008* (2013.01)

(58) Field of Classification Search
CPC .................................................. A01F 15/0875
See application file for complete search history.

(56) References Cited

U.S. PATENT DOCUMENTS

| | | | | |
|---|---|---|---|---|
| 2,431,194 A | * | 11/1947 | O'Brien | B66C 1/125 294/75 |
| RE25,750 E | * | 3/1965 | Adams et al. | A01D 90/08 414/503 |
| 4,009,663 A | * | 3/1977 | Keller | D01G 13/00 414/401 |
| 4,557,021 A | * | 12/1985 | Nash | D01G 23/08 19/145.5 |
| 5,213,030 A | * | 5/1993 | Bolstad | B65B 27/12 206/83.5 |
| 5,738,287 A | * | 4/1998 | Vanderberg | A01F 29/005 241/101.76 |
| 9,986,689 B2 | | 6/2018 | Riesterer | |
| 10,436,913 B2 | * | 10/2019 | Lang | A01F 15/08 |

(Continued)

FOREIGN PATENT DOCUMENTS

CN 110579193 A * 12/2019 ............. G01B 21/00

OTHER PUBLICATIONS

Extended European Search Report for EP Application No. 22151799.8 dated Jun. 15, 2022 (seven pages).

*Primary Examiner* — Shelley Chen
(74) *Attorney, Agent, or Firm* — Peter Zacharias (57) ABSTRACT

An agricultural vehicle includes: a chassis; a crop material handler carried by the chassis and configured to handle crop material; a communication interface carried by the chassis; and a controller operatively coupled to the communication interface and configured to: define a field map corresponding to a field; receive a bale drop zone input signal; define a bale drop zone within the field map based on the received bale drop zone input signal, the bale drop zone defining a location and a bale drop area within the field map; determine if the bale drop zone is sufficiently sized for a number of bales formed from crop material on the field to be placed in the bale drop zone; and output a drop zone insufficient signal if the bale drop zone is not sufficiently sized for the number of bales to be placed in the bale drop zone.

20 Claims, 6 Drawing Sheets

(56) References Cited

U.S. PATENT DOCUMENTS

| | | | |
|---|---|---|---|
| 11,268,815 B2* | 3/2022 | Johnson | A01B 79/005 |
| 11,280,614 B2* | 3/2022 | Johnson | A01D 87/122 |
| 2015/0216125 A1 | 8/2015 | Olander et al. | |
| 2017/0013783 A1 | 1/2017 | Kirk et al. | |
| 2017/0354092 A1* | 12/2017 | Lang | G01S 19/24 |
| 2018/0252532 A1* | 9/2018 | Johnson | A01B 79/005 |
| 2019/0289769 A1 | 9/2019 | Antich | |
| 2020/0033125 A1* | 1/2020 | Johnson | A01B 69/008 |
| 2020/0103904 A1 | 4/2020 | Boydens et al. | |
| 2021/0150353 A1* | 5/2021 | Watanabe | G06Q 10/043 |

\* cited by examiner

AGRICULTURAL VEHICLE WITH CONTROLLER FOR DETERMINING SUFFICIENTLY SIZED BALE DROP ZONE

BACKGROUND OF THE INVENTION

Agricultural vehicles, such as balers, are well-known for collecting cut crop material and packing the cut crop material into bales for easier transport. A typical baler has a crop collector, which also may be referred to as a "pickup", that utilizes tines or other elements to direct the cut crop material to a bale chamber that packs the crop material into a bale. After the crop material is packed into a bale with the desired size, the bale is ejected out the back of the baler.

Once the bale is formed, it needs to be transported from the field to a different location, such as a staging area, where the bale is stored. A bale retriever that includes a bale fork or similar pick up mechanism may be used to pick up multiple bales and move the bales to the staging area. While known bale retrievers are effective to pick up and transport bales, problems can arise if, for example, the bale retriever does not have a suitable place to drop off the collected bale(s).

What is needed in the art is a way to address some of the previously described issues with known agricultural vehicles.

SUMMARY OF THE INVENTION

Exemplary embodiments disclosed herein provide an agricultural vehicle with a controller that is configured to determine if a bale drop zone is sufficiently sized for a number of bales formed from crop material on a field and output a drop zone insufficient signal if the bale drop zone is not sufficiently sized for the number of bales to be placed in the bale drop zone.

In some exemplary embodiments provided according to the present disclosure, an agricultural vehicle includes: a chassis; a crop material handler carried by the chassis and configured to handle crop material; a communication interface carried by the chassis and configured to communicate with at least one of another agricultural vehicle or a network; and a controller operatively coupled to the communication interface and configured to: define a field map corresponding to a field; receive at least one bale drop zone input signal; define a bale drop zone within the field map based on the received at least one bale drop zone input signal, the bale drop zone defining a location and a bale drop area within the field map; determine if the bale drop zone is sufficiently sized for a number of bales formed from crop material on the field to be placed in the bale drop zone; and output a drop zone insufficient signal if the bale drop zone is not sufficiently sized for the number of bales to be placed in the bale drop zone.

In some exemplary embodiments provided according to the present disclosure, a system for producing and transporting crop material bales includes: at least one agricultural vehicle, the at least one agricultural vehicle includes: a chassis; a crop material handler carried by the chassis and configured to handle crop material; a communication interface carried by the chassis and configured to communicate with at least one of another agricultural vehicle or a network; and a controller operatively coupled to the communication interface and configured to: define a field map corresponding to a field; receive at least one bale drop zone input signal; define a bale drop zone within the field map based on the received at least one bale drop zone input signal, the bale drop zone defining a location and a bale drop area within the field map; determine if the bale drop zone is sufficiently sized for a number of bales formed from crop material on the field to be placed in the bale drop zone; and output a drop zone insufficient signal if the bale drop zone is not sufficiently sized for the number of bales to be placed in the bale drop zone.

One possible advantage that may be realized by exemplary embodiments disclosed herein is that the controller of the agricultural vehicle may alert an operator if a defined bale drop zone is not sufficiently sized for the number of bales that can be produced from a field, allowing the operator to decide if a new bale drop zone should be chosen.

Another possible advantage that may be realized by exemplary embodiments disclosed herein is that the controller can re-evaluate if the bale drop zone is sufficiently sized for the number of bales as more data about the crop material in the field is collected.

Yet another possible advantage that may be realized by exemplary embodiments disclosed herein is that the controller can set a sufficiently sized bale drop zone as a return location to steer, for example, a bale retriever to the bale drop zone automatically.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
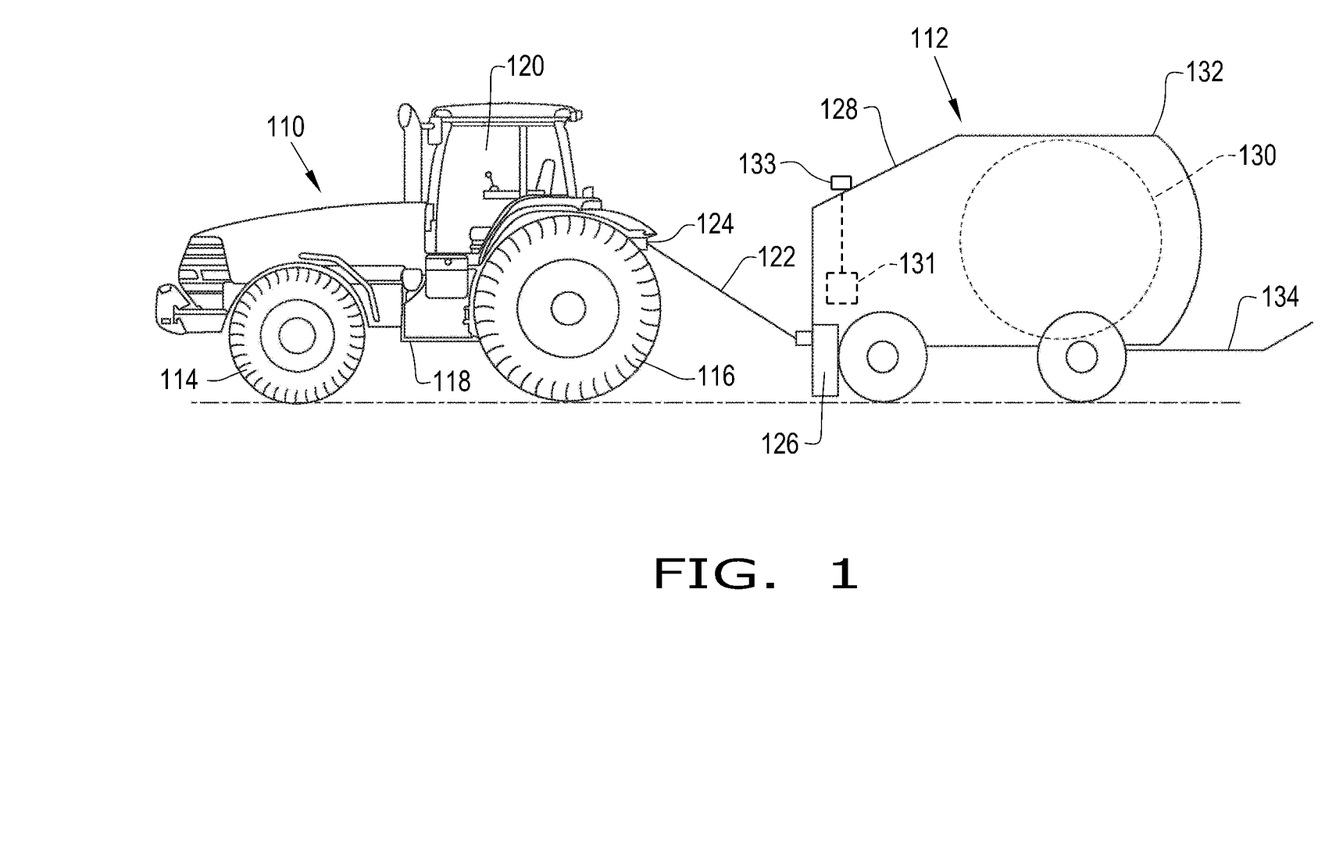
FIG. 1 illustrates a side view of an exemplary embodiment of a tractor and a baler that may be an agricultural vehicle of a system for producing and transporting crop material bales, provided in accordance with the present disclosure.

Referring now to the drawings, FIG. 1 illustrates a side view of an exemplary embodiment of a work vehicle 110 towing an agricultural vehicle in the form of a baler 112 in accordance with the present disclosure to perform a baling operation within a field. As will be described further herein, the baler 112 may be part of a system 200 for producing and transporting crop material bales that includes the baler 112 and a bale retriever 202 (illustrated in FIG. 2). As shown, the work vehicle 110 is configured as an agricultural tractor, such as an operator-driven tractor or an autonomous tractor. However, in some embodiments, the work vehicle 110 may correspond to any other suitable vehicle configured to tow a baler across a field or that is otherwise configured to facilitate the performance of a baling operation, including an autonomous baling vehicle. Additionally, as shown, the baler 112 is configured as a round baler configured to generate round bales. However, in some embodiments, the baler 112 may have any other suitable configuration, including being configured to generate square or rectangular bales. It should be further appreciated that the baler 112, while shown as being towed by a tractor 110, may also be a self-propelled baler that does not rely on a separate vehicle for propulsion and/or power to function.

As shown in FIG. 1, the work vehicle 110 includes a pair of front wheels 114, a pair of rear wheels 116, and a chassis 118 coupled to and supported by the wheels 114, 116. An operator's cab 120 may be supported by a portion of the chassis 118 and may house various input devices for permitting an operator to control the operation of the work vehicle 110 and/or the baler 112. Additionally, the work vehicle 110 may include an engine and a transmission mounted on the chassis 118. The transmission may be operably coupled to the engine and may provide variably adjusted gear ratios for transferring engine power to the wheels 116 via a drive axle assembly.

As shown in FIG. 1, the work vehicle 110 may be coupled to the baler 112 via a tongue 122 mounted on a hitch 124 of the work vehicle 110 to allow the vehicle 110 to tow the baler 112 across the field. As such, the work vehicle 110 may, for example, guide the baler 112 toward crop material deposited in windrows on the field. As is generally understood, to collect the crop material, the baler 112 includes a crop collector 126 (shown schematically in FIG. 1) mounted on the front end of the baler 112. The crop collector 126 may, for example, have a rotating wheel with tines that collects crop material from the ground and directs the crop material toward a bale chamber 128 of the baler 112. Inside the bale chamber 128, rollers, belts, and/or other devices compact the crop material to form a generally cylindrically shaped bale 130. The bale 130 is contained within the baler 112 until ejection of the bale 130 is instructed (e.g., by the operator and/or a baler controller 131). In some embodiments, the bale 130 may be automatically ejected from the baler 112 once the bale 130 is formed by the baler controller 131 detecting that the bale 130 is fully formed and outputting an appropriate ejection signal.

As shown in FIG. 1, the baler 112 may also include a tailgate 132 movable between a closed position (as shown in the illustrated embodiment) and an opened position via a suitable actuator assembly. The tailgate 132 and/or actuator assembly may be controlled to open and close by the baler controller 131. In the closed position, the tailgate 132 may confine or retain the bale 130 within the baler 112. In the open position, the tailgate 132 may rotate out of the way to allow the bale 130 to be ejected from the bale chamber 128. Additionally, as shown in FIG. 1, the baler 112 may include a ramp 134 extending from its aft end that is configured to receive and direct the bale 130 away from the baler 112 as it is being ejected from the bale chamber 128. In some embodiments, the ramp 134 may be spring loaded, such that the ramp 134 is urged into a raised position, as illustrated. In such embodiments, the weight of the bale 130 on the ramp 134 may drive the ramp 134 to a lowered position in which the ramp 134 directs the bale 130 to the soil surface. Once the bale 130 is ejected, the bale 130 may roll down the ramp 134 and be deposited onto the field. As such, the ramp 134 may enable the bale 30 to maintain its shape and desired density by gently guiding the bale 30 onto the field.

It should be appreciated that the configuration of the work vehicle 110 described above and shown in FIG. 1 is provided only as one example. Thus, it should be appreciated that the present disclosure may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 110, or rely on tracks in lieu of the wheels 114, 116. Additionally, as indicated previously, the work vehicle 110 may, in some embodiments, be configured as an autonomous vehicle. In such embodiments, the work vehicle 110 may include suitable components for providing autonomous vehicle operation and, depending on the vehicle configuration, need not include the operator's cab 120.

Additionally, it should be appreciated that the configuration of the baler 112 described above and shown in FIG. 1 is provided only as one example. Thus, it should be appreciated that the present disclosure may be readily adaptable to any manner of baler configuration. For example, as indicated previously, the baler 112 may, in some embodiments, correspond to a square baler configured to generate square or rectangular bales.

Figure 2:
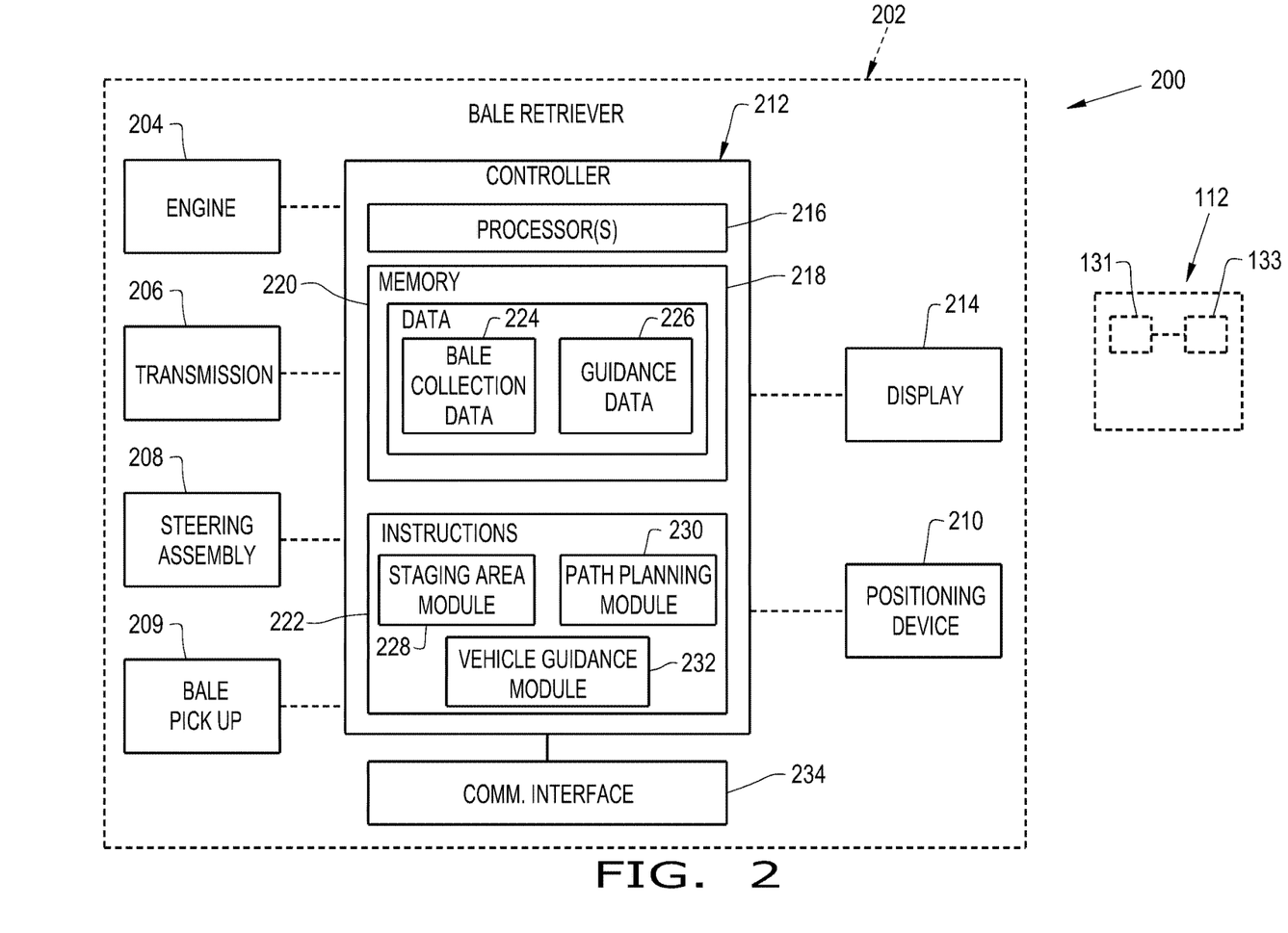
FIG. 2 illustrates a schematic diagram of an exemplary embodiment of a bale retriever that may be an agricultural vehicle of the system for producing and transporting crop material bales, provided in accordance with the present disclosure.

Referring now to FIG. 2, a schematic view of an exemplary embodiment of a system 200 for producing and collecting crop material bales is illustrated in accordance with the present disclosure. In general, the system 200 will be described herein with reference to the work vehicle 110 and the baler 112 described previously with reference to FIG. 1 and/or another agricultural vehicle, such as a bale retriever 202. However, it should be appreciated that the system 200 may generally be utilized with one or more agricultural vehicles having any suitable vehicle configuration and/or balers having any suitable baler configuration. Additionally, for purposes of providing an example of a bale production and collection operation, the system 200 will generally be described herein with reference to performance of the bale production and collection operation following the example baling operation described herein. However, it should be appreciated that the system 200 may generally be utilized to perform a bale collection and transportation operation following the performance of any suitable baling operation within any suitable field.

The system 200 includes at least one agricultural vehicle, which may be at least one baler 112 and/or at least one bale retriever 202 configured to collect bales previously deposited within a field. In some embodiments, the bale retriever 202 may be towed by the tractor 110 described previously with reference to FIG. 1. For example, upon completion of the baling operation, the baler 112 may be unhitched from the tractor 110 and a suitable bale pick up or other implement (e.g., a bale spear) may be installed on the tractor 110 to allow for the collection of bales from the field. In some embodiments, the bale retriever 202 may correspond to another suitable vehicle that can be used to collect bales standing within the field, including any suitable autonomous vehicle and/or any suitable operator-driven vehicle (e.g., a skid-steer loader). It should be appreciated that, in some embodiments, the baler(s) 112 and the bale retriever(s) 202 are separate vehicles in the system 200 that can operate simultaneously within a field to produce and collect crop material bales.

As shown in FIG. 2, the bale retriever 202 may include various components for allowing the bale retriever 202 to be moved across the field during the bale collection operation. For example, the bale retriever 202 may include an engine 204 and a transmission 206 coupled to the engine 204 for propelling the vehicle 202 through the field. In addition, the bale retriever 202 may include a steering assembly 208 for steering the bale retriever 202. In some embodiments, the steering assembly 208 may be configured to be manually operated via the operator to steer the vehicle 202. The steering assembly 208 may also be configured to be automatically and/or autonomously controlled to allow the bale retriever 202 to be directed along a predetermined path(s) across the field, either additionally or alternatively to manual control of the steering assembly 208. For example, in some embodiments, the steering assembly 208 may include or form part of an auto-guidance system for automatically steering the bale retriever 202. In such an embodiment, the bale retriever 202 may correspond to a fully autonomous vehicle, a semi-autonomous vehicle, or an otherwise manually operated vehicle having one or more autonomous functions (e.g., automated steering or auto-guidance functions). The bale retriever 202 also includes a bale pick up 209, which may be a fork or other component that is configured to pick up crop material bales from a field and, for example, place the picked up bale on a holding platform (which may include a conveyor) of the bale retriever 202.

Additionally, the bale retriever 202 may also include a positioning device 210 configured to monitor or track the position of the vehicle 202 as it is traversed across a field. For example, in some embodiments, the positioning device 210 may be configured to determine the exact location of the bale retriever 202 using a satellite navigation position system (e.g. a GPS system, a Galileo positioning system, the Global Navigation satellite system (GLONASS), the BeiDou Satellite Navigation and Positioning system, and/or the like).

As shown in FIG. 2, the bale retriever 202 may also include a controller 212, which may also be referred to herein as a "retriever controller." The controller 212 is operatively coupled to the steering assembly 208 and, in some embodiments, one or more other components of the bale retriever 202 (e.g., the engine 204 and/or the transmission 206) for electronically controlling the operation of such component(s) (e.g. electronic control based on inputs received from the operator and/or automatic electronic control for executing one or more autonomous control functions). As will be described in greater detail herein, the controller 212 is configured to generate one or more paths for the bale collection operation while being capable of taking into account any negative impacts to the field (e.g., compaction and/or yield losses). For example, the controller 212 may be configured to generate guidance lines for collecting the various bales deposited within the field and for transporting such bales to a selected location defined relative to the field (e.g., a staging area). The controller 212 may then utilize the guidance lines for guiding the bale retriever 202 across the field as each bale is collected and subsequently delivered to the selected staging area. For example, in some embodiments, the controller 212 may be configured to automatically control the operation of the bale retriever 202 via control of the steering assembly 208 such that the bale retriever 202 is moved across the field along the determined guidance lines without any operator input (e.g., for autonomous vehicle operation and/or when otherwise operating in an autonomous mode). Alternatively, the controller 212 may be configured to display the determined guidance lines on an associated display 214 of the bale retriever 202 to allow the operator to navigate the vehicle 202 across the field based on the displayed guidance lines.

In general, the controller 212 may correspond to any suitable processor-based device(s), such as a computing device or any combination of computing devices. Thus, as shown in FIG. 2, the controller 212 may generally include one or more processor(s) 216 and associated memory devices 218 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 218 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 218 may generally be configured to store information accessible to the processor(s) 216, including data 220 that can be retrieved, manipulated, created and/or stored by the processor(s) 216 and instructions 222 that can be executed by the processor(s) 216.

In some embodiments, the data 220 may be stored in one or more databases. For example, the memory 218 may include a bale collection database 224 for storing data associated with the bales to be collected from the field during the performance of the bale collection operation. Such data may, for instance, include any data collected during the performance of the prior baling operation, such as the position data associated with the location of the baling paths relative to the field, the heading data associated with the heading of the vehicle/baler along each baling path, and/or the position data associated with the specific location of each bale within the field. In addition, various other types of data may be stored within the bale collection database 224. For example, in some embodiments, data may be stored within the bale collection database 224 that is associated with one or more operator inputs, one or more user-defined system preferences, and/or other system inputs relevant to one or more aspects of the present disclosure, such as data associated with the specific type of bales being collected (e.g., round bales vs. square/rectangular bales), data associated with the specific size of bales being collected (e.g., 4×5, 5×5, or 6×5), data associated with a desired or selected location for the staging area at which the bales will be aggregated, data associated with a desired spacing or arrangement of the collected bales within the staging area, and/or any other relevant data.

Additionally, as shown in FIG. 2, the memory 218 may also include a guidance database 226 for storing data associated with guiding the bale retriever 202 during the performance of the bale collection operation. For example, as indicated previously, the controller 212 may be configured to generate guidance lines along which the bale retriever 202 is to be traversed when collecting the bales and subsequently aggregating the bales at the desired staging area. As such, the guidance database 226 may, for example, include data associated with the computer-generated guidance lines, such as GPS data or map data that maps each guidance line across the field.

Referring still to FIG. 2, in some embodiments, the instructions 222 stored within the memory 218 of the controller 212 may be executed by the processor(s) 216 to implement a staging area module 228. In general, the staging area module 228 may be configured to determine a location(s) relative to the field that will serve as a "staging area," which is also called a "bale drop zone," for aggregating the various bales being collected from the field. Specifically, in some embodiments, the staging area module 228 may be configured to automatically select the location for the staging area based on one or more factors, including, but not limited to, the locations of the various bales within the field, the size and/or shape of the field, and/or any user-defined or predetermined system preferences associated with the desired location of the staging area relative to the field. The instructions 222 stored within the memory 218 of the controller 212 may also be executed by the processor(s) 216 to implement a path planning module 230, which may be configured to plan a travel path of the bale retriever 202, and a vehicle guidance module 232, which may be configured to guide the bale retriever 202.

Figure 3:
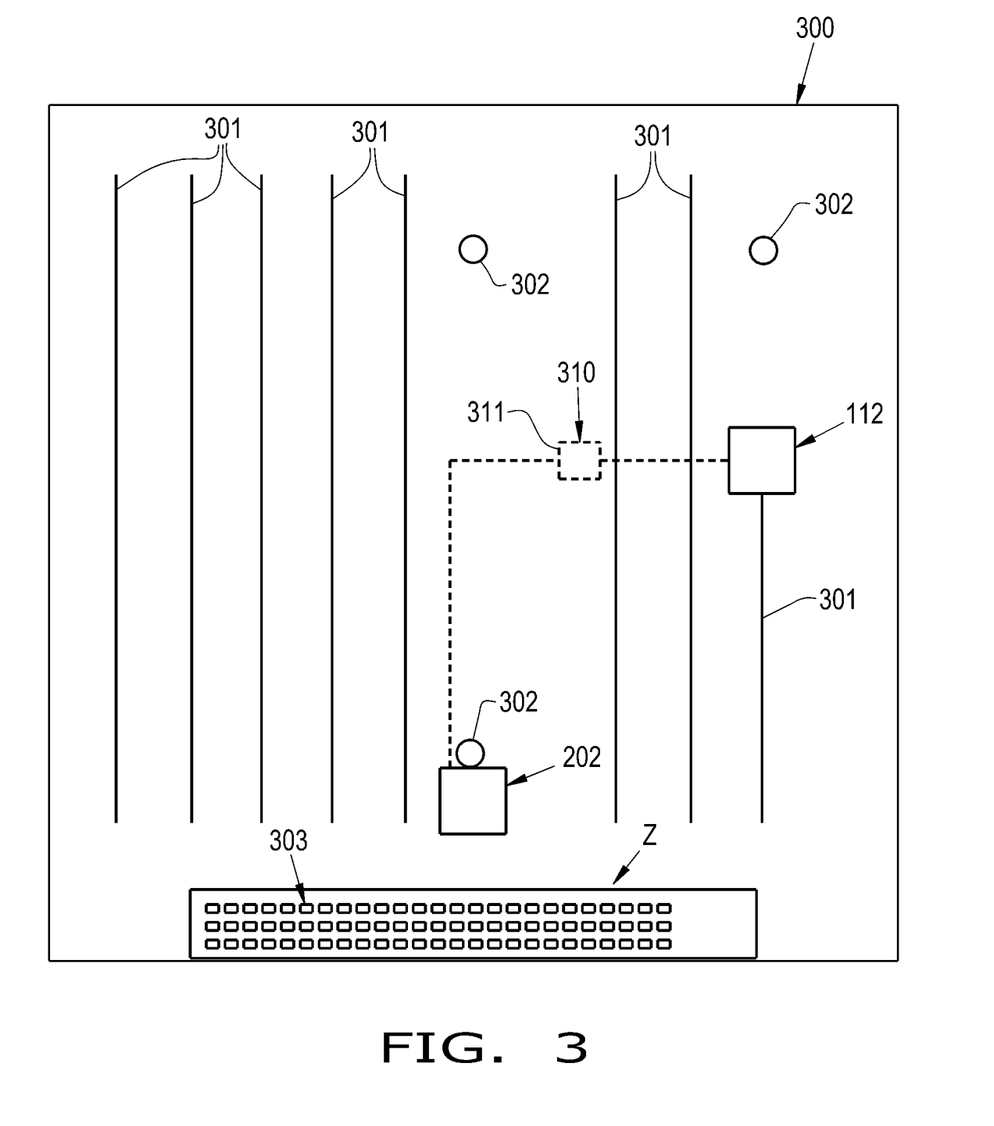
FIG. 3 illustrates a schematic view of an exemplary embodiment of a field map that may be defined by a controller of the bale retriever of FIG. 2 and/or the baler of FIG. 1, in accordance with the present disclosure.

Referring now to FIG. 3, the system 200 is illustrated in graphical form on a field map 300. The controller 212 of the bale retriever 202 and/or a controller 131 of the baler 112 (illustrated in FIG. 1) is configured to define the field map 300, which corresponds to a field. For ease of reference, functionality of the controller 212 of the bale retriever 202 provided according to the present invention will be described further herein, but it should be appreciated that the controller 131 of the baler 112 and/or a controller of a different agricultural vehicle, such as a mower-conditioner, can perform the described functionality. In some embodiments, the field map 300 is constructed and updated solely within the controller 212; in other embodiments, the field map 300 is presented as a graphic on the display 214 in a manner that is similar to the graphical illustration of the field map 300 of FIG. 3, as will be described further herein. It should thus be appreciated that the field map 300 may be constructed solely for use by the controller 212 or, alternatively, may also be presented graphically on a display 214 or elsewhere so an operator may see the state of the field via the field map 300.

Field information corresponding to the field map 300 may come from a variety of sources. In some embodiments, the field information comes from the baler 112 as it operates and is continuously output to a communication interface 234 of the bale retriever 202, which is operatively coupled to the controller 212 and may also be referred to as a "retriever communication interface," so the controller 212 is configured to receive real-time information corresponding to various aspects of the baler 112 and the field. For example, the communication interface 234 of the bale retriever 202 may interface with a corresponding communication interface 133 operatively coupled to the controller 131 of the baler 112 (illustrated in FIG. 1) using radio signals or other types of communication signals to receive the field information. Alternatively, field information corresponding to the field map 300 may be received from a network 310 that is established with the system 200 using one or more communication protocols and a network hub 311 that interfaces with the respective communication interfaces 133, 234 but is not carried by either the baler 112 or the bale retriever 202. The network hub 311 may be, for example, a device commonly known as a "router" or similar device. It should be appreciated that the controller 212 of the bale retriever 202 may receive field information from other sources, such as a vehicle other than the baler 112, e.g., a mower-conditioner and/or an unmanned aerial vehicle. Further, while the field information is described previously as being transmitted to the controller 212 wirelessly, in some embodiments the field information corresponding to the field map 300 is received by the controller 212 from a physical connection, i.e., a wired connection, and/or a physical data source, e.g., a memory module. It should thus be appreciated that the field information corresponding to the field map 300 may be received by the controller 212 in a variety of ways.

In some embodiments, the controller 212 is configured to define at least one windrow, illustrated as a plurality of windrows 301 in FIG. 3, on the field map 300 that correspond to windrows in the field. The windrow(s) 301 can be defined in a variety of ways. In some embodiments, the windrow(s) 301 are defined based on swath lines that the baler 112 follows to travel through the field, with the swath lines being generally aligned with the windrows 301 so the baler 112 follows the windrows 301 to collect and pack crop material into bales 302, as illustrated.

In known systems, an operator may define an area of a field as a bale drop zone that is not sufficiently sized to hold all of the bales that will be produced from crop material on the field. In such a scenario, the operator will not know that the bale drop zone is not sufficiently sized to hold all of the bales until the operator has placed a number of bales in the bale drop zone, which may be a large number of bales by the time that the operator realizes that the bale drop zone will not be large enough for all of the bales. The operator must then decide whether to place the bales that do not fit in a separate area, which makes further transportation of the bales cumbersome, or define a new bale drop zone, which requires moving all of the previously placed bales and is also susceptible to not being large enough.

Figure 4:
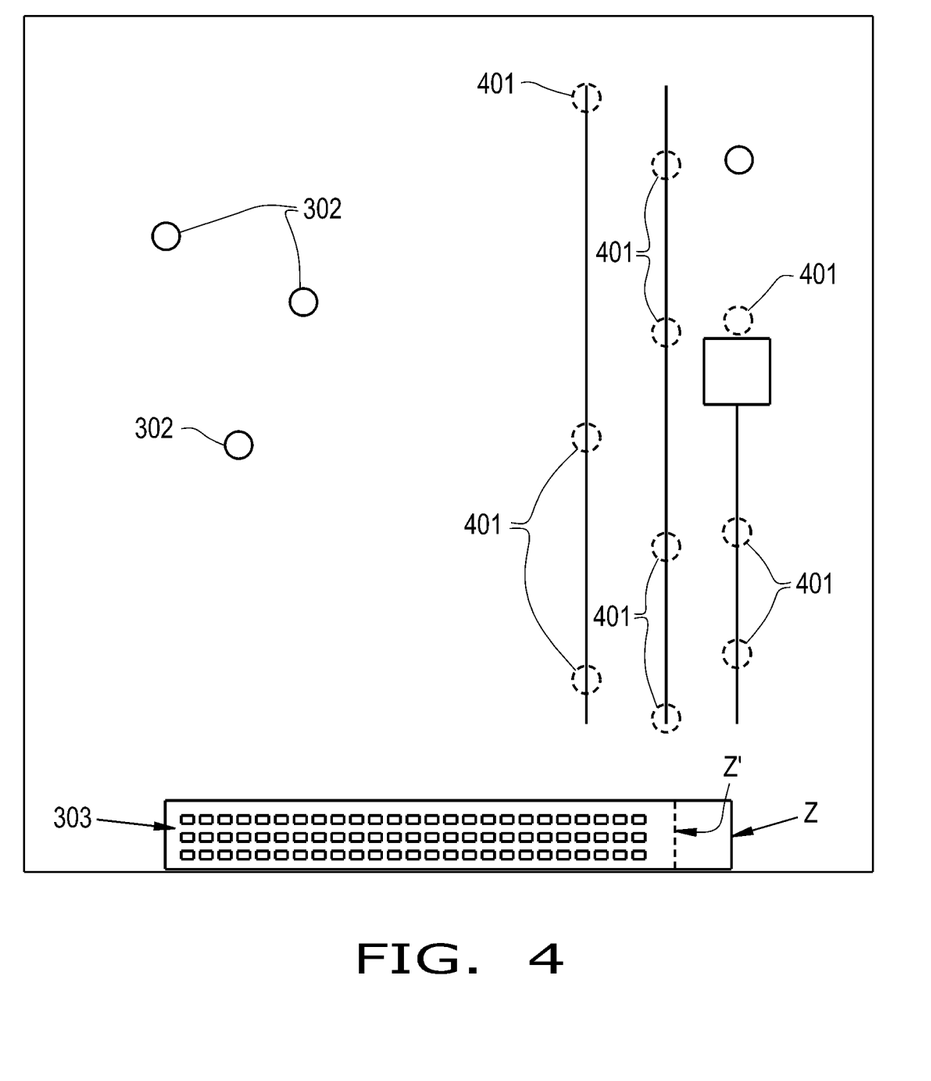
FIG. 4 illustrates the field map of FIG. 3 and how the controller may determine if the bale drop zone is sufficiently sized for a number of bales formed from crop material on the field, in accordance with the present disclosure.

To address some of the previously described issues, and referring still to FIG. 3 and now FIG. 4 as well, the controller 212 is configured to receive at least one bale drop zone input signal and define a bale drop zone Z within the field map 300 based on the received bale drop zone input signal(s). The bale drop zone Z, as illustrated, defines a location and a bale drop area within the field map 300. It should be appreciated that while the term "area" is used, the "bale drop area" may also encompass a volume if, for example, bales can be stacked in the bale drop zone Z. The controller 212 is configured to determine if the bale drop zone Z is sufficiently sized for a number of bales 302 formed from crop material on the field to be placed in the bale drop zone Z and output a drop zone insufficient signal if the bale drop zone Z is not sufficiently sized for the number of bales 302 to be placed in the bale drop zone Z, i.e., if the number of bales 302 will not fit within the bale drop zone Z according to defined parameters. In some embodiments, the controller 212 takes into account spacing requirements between the bales to be placed in the bale drop zone Z when determining if the bale drop zone Z is sufficiently sized, which is illustrated in FIGS. 3 and 4 by placed bales 303 in the bale drop zone Z having space therebetween.

As illustrated in FIG. 3, the agricultural vehicle with the controller defining the bale drop zone Z may be the bale retriever 202, which has a steering assembly 208 that can steer the bale retriever 202. The controller 212 is operatively coupled to the steering assembly 208 and may be configured to set the bale drop zone Z as a return location if the bale drop zone Z is sufficiently sized for the number of bales 302 and control the steering assembly 208 to steer the bale retriever 202 toward the bale drop zone Z upon the bale retriever 202 retrieving a defined retrieved number of bales from the field. The defined retrieved number of bales may, for example, correspond to the maximum number of bales that the bale retriever has space and/or power to hold and transport. In such embodiments, the controller 212 can be configured to keep count of the number of bales retrieved by the bale retriever 202 and cause the steering assembly 208 to steer the bale retriever 202 toward the bale drop zone Z upon the bale retriever 202 reaching its capacity of picked-up bales.

Figure 5:
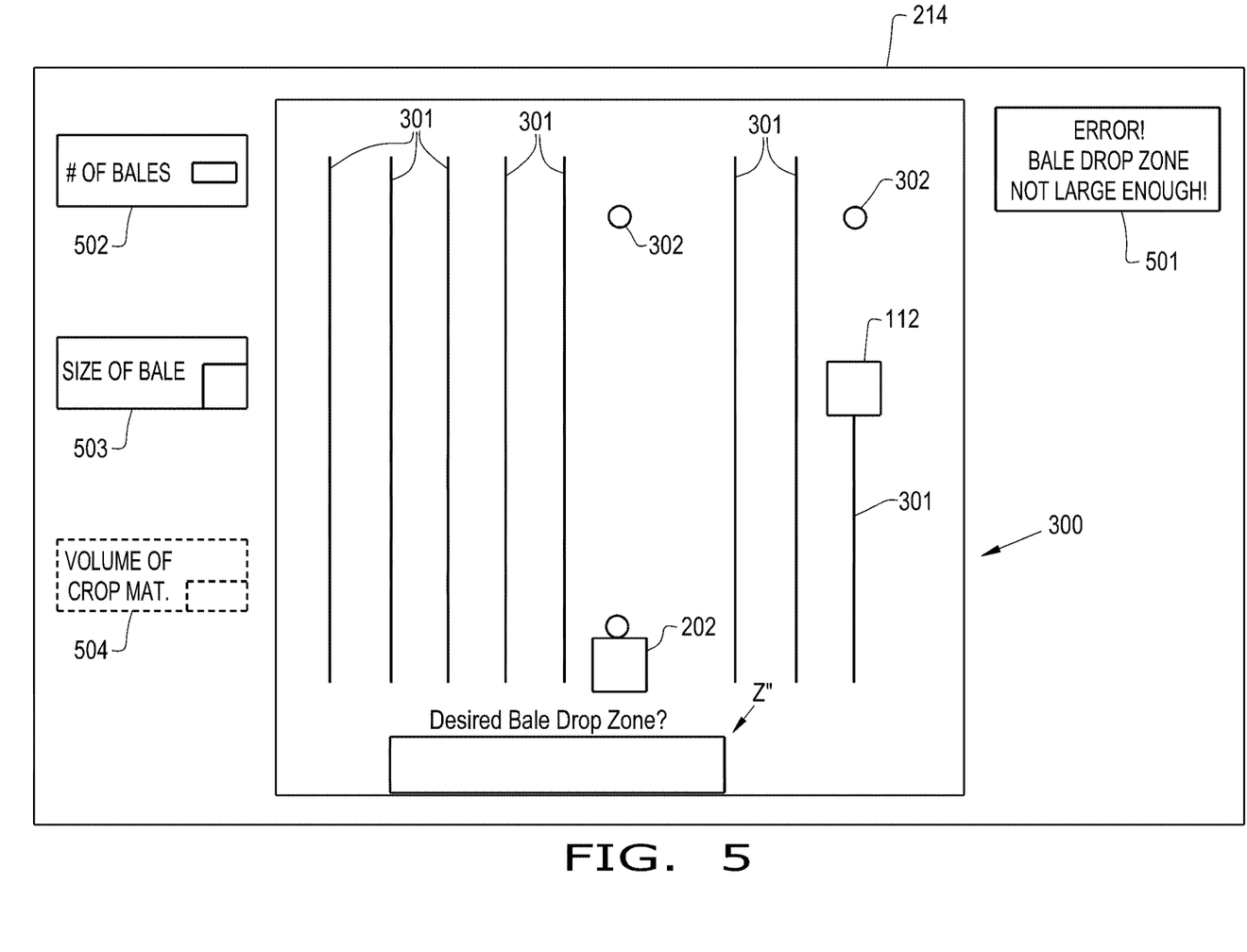
FIG. 5 illustrates an exemplary embodiment of a display of the bale retriever of FIG. 2 and/or the baler of FIG. 1 presenting an error message when the defined bale drop zone is not sufficiently sized, in accordance with the present disclosure.

In some embodiments, and referring now to FIG. 5 as well, the controller 212 is operatively coupled to the display 214, as previously described. The display 214 is configured to receive the drop zone insufficient signal from the controller 212 and present a bale drop zone error 501 responsively to receiving the drop zone insufficient signal. In some embodiments, the bale drop zone error 501 is in the form of text and/or another graphical representation that alerts an operator to the fact that a defined bale drop zone Z" is insufficiently sized for the number of bales to be placed in the defined bale drop zone Z". The display 214 may be further configured as a touch screen or other input device that is configured to output the bale drop zone input signal(s) to the controller 212. As illustrated in FIG. 5, an operator may draw a desired bale drop zone Z" on a graphical representation of the field map 300 presented on the display 214. When the desired bale drop zone Z" is set by the operator, the display 214 outputs one or more bale drop zone input signals to the controller 212, which defines the desired bale drop zone Z" within the field map 300 and determines if the desired bale drop zone Z" is sufficiently sized for the number of bales to be placed in the desired bale drop zone Z". In the scenario illustrated in FIG. 5 where the desired bale drop zone Z" is insufficiently sized, the controller 212 outputs the drop zone insufficient signal to the display 214, which then presents the bale drop zone error 501.

In some embodiments, the controller 212 is configured to determine at least one modifiable parameter so the bale drop zone Z" is sufficiently sized for the number of bails and output the drop zone insufficient signal to incorporate data about the modifiable parameter. For example, the controller 212 may be configured to output the drop zone insufficient signal incorporating data about the modifiable parameter to the display 214, which may display the modifiable parameter(s) that can be modified so the bale drop zone Z" is sufficiently sized for the number of bales. Example modifiable parameters include, but are not limited to: a bale diameter, a bale density, a bale spacing within the bale drop zone, a bale stacking height, and/or a drop zone area required for the bale drop zone to be sufficiently sized. By presenting such information on the display 214, an operator may choose one or more of the parameters to change so the desired bale drop zone Z" is sufficiently sized for the bales.

In some embodiments, such as embodiments where the controller 212 is incorporated in an autonomous vehicle, the controller 212 is configured to choose at least one of the modifiable parameters according to a defined priority and/or an allowable range and output a modification signal to adjust at least one parameter of the desired bale drop zone Z" and/or the baler 112. For example, the controller 212 may be configured to receive an allowable adjustment range, from user input or otherwise, and determine a highest priority modifiable parameter that is adjustable to be within the allowable adjustment range and also satisfying the condition that the desired bale drop zone Z" is sufficiently sized for the number of bales. The controller 212 may be configured, for example, to prioritize modifiable parameters as: 1) drop zone area, 2) bale diameter, 3) bale density, and 4) bale stack height within the bale drop zone. If the controller 212 determines that the bale diameter and bale stack height can be modified to be within the respective allowable adjustment ranges, but the drop zone area and the bale density cannot, the controller 212 may choose the bale diameter as the modifiable parameter, owing to its higher priority, and output a modification signal to the baler 112 to adjust the bale diameter of formed bales so the desired bale drop zone Z" is sufficiently sized for the number of bales to be formed.

While the bale drop zone input signal may come from an element of the bale retriever 202, such as the display 214, in some embodiments the bale drop zone input signal comes from outside the bale retriever 202. For example, the bale drop zone input signal may be generated by the controller 131 of the baler 112 and output to the communications interface 234 of the bale retriever 202 by the communication interface 133 of the baler 112, either directly or via the network 310. Thus, in some embodiments, the communications interface 234 is configured to receive the bale drop zone input signal from another agricultural vehicle, such as the baler 112, and/or the network 310.

In some embodiments, the controller 212 determines the number of bales formed from crop material on the field based on operator input. For example, as illustrated in FIG. 5, the display 214 may present a bale input graphic 502 that allows the operator to input the number of bales that will be formed from crop material on the field. The display 214 may also present a size input graphic 503 that allows the operator to input the size of each bale that will be formed. Upon those values being entered, the display 214 can output a bale number signal and a bale volume signal to the controller 212. From the bale number signal and the bale volume signal, the controller 212 can determine a total space requirement for the number of bales and compare the total space requirement to the desired bale drop zone Z" in order to determine if the desired bale drop zone Z" is sufficiently sized for the number of bales.

In some embodiments, the controller 212 is configured to determine the number of bales formed from crop material on the field based on a variety of inputs. In some embodiments, the controller 212 is configured to define an expected volume of crop material on the field, define a volume of crop material per bale, and determine the number of bales based on the expected volume of crop material and the volume of crop material per bale. For example, the expected volume of crop material can be defined based on operator input by the display 214 presenting a crop material volume graphic 504. Upon the operator entering the expected volume of crop material in the graphic 504, the display 214 can output an expected crop volume signal to the controller 212. The controller 212 can be configured to define the volume of crop material per bale based on the bale volume signal, as previously described, since the size of the bale corresponds to the volume of crop material packed into the bale and the packing density, which the controller 212 can also account for in making the determination. Once the expected volume of crop material and the volume of crop material per bale are known, the controller 212 can determine the number of bales by dividing the expected volume of crop material by the volume of crop material per bale.

In some embodiments, the controller 212 is configured to receive a crop yield signal corresponding to a volume of crop material on the field, define a volume of crop material per bale, and determine the number of bales based on the volume of crop material and the volume of crop material per bale. The crop yield signal may be received by the controller 212, for example, via the communications interface 234 interfacing with the communications interface 133 of the baler 112. The controller 131 of the baler 112 may be configured to keep track of how much crop material the baler 112 has handled and define the volume of crop material accordingly. Alternatively, or in addition, the crop yield signal may be output by a mower-conditioner that cut crop material in the field and has a controller configured to track the volume of crop material as it is cut. The crop yield signal may additionally, or alternatively, be output by other yield monitoring equipment, including but not limited to a rake or an unmanned aerial vehicle. Other ways that the controller 212 may be configured to determine the amount of crop material may be based on, but is not limited to: receiving a yield signal generated during a raking and/or a merging operation that corresponds to the crop material yield of the field; receiving a yield estimate signal during baling that estimates a crop material yield of a first portion of a field and, based on the estimated yield, extrapolating the crop material yield to the entirety of the field; and/or receiving a yield signal corresponding to one or more historical crop material yields from the field. The defined volume of crop material per bale may be defined by the controller 212 of the bale retriever 202, based on operator input or otherwise, or, alternatively, may be defined based on the controller 212 receiving a bale volume signal from the controller 131 of the baler 112, which may control the volume of crop material that is packed into each bale formed by the baler 112. The controller 212 may then determine the number of bales by dividing the volume of crop material by the volume of crop material per bale, as previously described. It should thus be appreciated that the controller 212 may be configured in a variety of ways to determine the number of bales formed from crop material on the field to be placed in the bale drop zone Z, Z", if the number of bales is not directly input by an operator.

As illustrated in FIG. 4, the controller 212 may be configured to predict a number of unformed bales 401 that are left in a field based on the volume of crop material left in the field and the volume of crop material per bale. The controller 212 may be further configured to determine if a previously defined bale drop zone Z' is sufficiently sized to hold the number of unformed bales 401, taking into account a number of bales 402 already placed in the bale drop zone Z'. If the controller 212 determines the bale drop zone Z' is insufficiently sized, the controller 212 may be configured to extend the bale drop zone Z' to a modified bale drop zone Z and output a modified bale drop zone signal with the drop zone insufficient signal to the display 214, alerting an operator to the fact that the bale drop zone Z' is not sufficiently sized while also providing the modified bale drop zone Z as a potential modification to the bale drop zone Z' for the operator to consider.

While the previous description focuses on the controller 212 of the bale retriever 202 performing the previously described functionality, it should be appreciated that, in some embodiments, the controller 131 of the baler 112 is configured to perform such functionality. Alternatively, or in addition, the controller may be part of the tractor 110 that tows the baler 112. In such embodiments, the controller 131 of the baler 112 may be configured to output different types of signals to the retriever controller 212 via the respective communications interfaces 133, 234. For example, the controller 131 may be configured to determine if a defined bale drop zone, such as the bale drop zone Z, is sufficiently sized for the number of bales to be placed in the bale drop zone Z and, if the bale drop zone is sufficiently sized, output a drop zone set signal corresponding to the sufficiently sized bale drop zone. The retriever controller 212 may be configured to receive the drop zone set signal output by the controller 131 via the retriever communication interface 234 and define the sufficiently sized bale drop zone as a return location for autonomous control of the steering assembly 208 and propulsion of the bale retriever 202 through the field. Such functionality can also be implemented in the controller of a different agricultural vehicle, such as a mower-conditioner. It should thus be appreciated that there are numerous ways to configure an agricultural vehicle in accordance with the present disclosure to assist an operator in defining a sufficiently sized bale drop zone for the number of bales that will be formed from crop material on a field.

From the foregoing, it should be appreciated that agricultural vehicles provided according to the present disclosure have a controller that can assist an operator determine if a bale drop zone is sufficiently sized for holding crop material bales that will be formed from a field and, if the bale drop zone is not sufficiently sized, alert the operator. The operator knowing that the bale drop zone is unlikely to be sufficient to hold the bales can save the operator time and aggravation by allowing the operator to, for example, see if one or more alternative bale drop zones are sufficiently sized for the number of bales before starting to place bales in the bale drop zone. The operator may also choose to alter the size, density, and/or spacing of the bales, for example, so the bales fit in the bale drop zone. If the system is partially or entirely autonomous, the controller determining if the bale drop zone is sufficiently sized can prevent the system from operating so bales are placed in an undesired way and/or location. Thus, exemplary embodiments provided according to the present disclosure can address the problems associated with a bale drop zone being insufficiently sized to hold the bales that are formed from crop material on a field.

Figure 6:
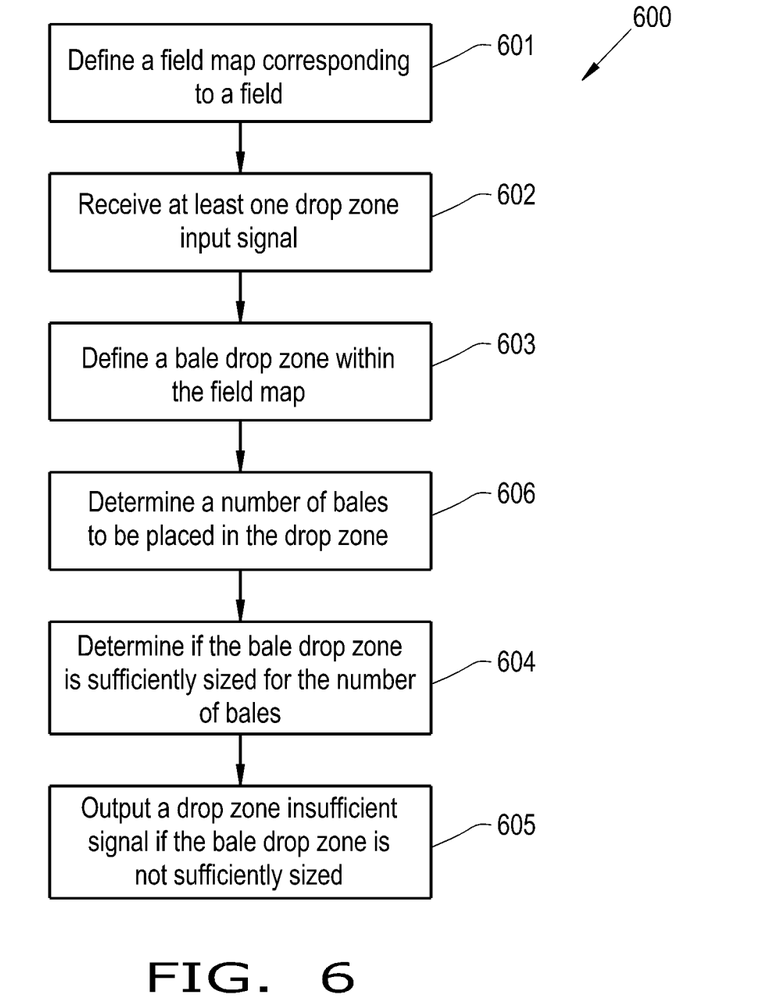
FIG. 6 illustrates a flow chart of an exemplary embodiment of a method for controlling an agricultural vehicle, provided in accordance with the present disclosure.

Referring now to FIG. 6, an exemplary embodiment of a method 600 for controlling an agricultural vehicle provided according to the present disclosure is illustrated in flow chart form. The agricultural vehicle may be the previously described baler 112 and/or the bale retriever 202, and/or, in some embodiments, a different agricultural vehicle such as a mower-conditioner. The method 600 is performed by a controller 131, 212 of the vehicle 112, 202 and includes defining 601 a field map 300 corresponding to a field; receiving 602 at least one drop zone input signal; defining 603 a bale drop zone Z, Z', Z" within the field map 300 based on the received bale drop zone input signal(s), the bale drop zone Z, Z', Z" defining a location and a bale drop area within the field map 300; determining 604 if the bale drop zone Z, Z', Z" is sufficiently sized for a number of bales formed from crop material on the field to be placed in the bale drop zone Z, Z', Z"; and outputting 605 a drop zone insufficient signal if the bale drop zone Z, Z', Z" is not sufficiently sized for the number of bales to be placed in the bale drop zone Z, Z', Z". In some embodiments, the method 600 includes determining 606 the number of bales to be placed in the bale drop zone Z, Z', Z". The determining 606 may be based on an expected volume of crop material and a volume of crop material per bale, with the volume of crop material being defined based on operator input and/or signals that are generated during handling of the crop material and/or historical data.

It is to be understood that the steps of the method 600 are performed by the controller 131, 212 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 131, 212 described herein, such as the method 600, is implemented in software code or instructions which are tangibly stored on a tangible computer readable medium. The controller 131, 212 loads the software code or instructions via a direct interface with the computer readable medium or via a wired and/or wireless network. Upon loading and executing such software code or instructions by the controller 131, 212, the controller 131, 212 may perform any of the functionality of the controller 131, 212 described herein, including any steps of the method 600 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural vehicle, comprising:
   a chassis;
   a crop material handler carried by the chassis and configured to handle crop material;
   a communication interface carried by the chassis and configured to communicate with at least one of another agricultural vehicle or a network; and
   a controller operatively coupled to the communication interface and configured to:
   define a field map corresponding to a field;
   receive at least one bale drop zone input signal;
   define a bale drop zone within the field map based on the received at least one bale drop zone input signal, the bale drop zone defining a location and a bale drop area within the field map;
   determine if the bale drop zone is sufficiently sized for a number of bales formed from crop material on the field to be placed in the bale drop zone; and
   output a drop zone insufficient signal if the bale drop zone is not sufficiently sized for the number of bales to be placed in the bale drop zone.

2. The agricultural vehicle of claim 1, wherein the agricultural vehicle is a bale retriever and the crop material handler is a bale pick up, the bale retriever further comprising a steering assembly configured to steer the bale retriever, the controller being operatively coupled to the steering assembly and further configured to set the bale drop zone as a return location if the bale drop zone is sufficiently sized for the number of bales and control the steering assembly to steer the bale retriever toward the bale drop zone upon the bale retriever retrieving a defined retrieved number of bales from the field.

3. The agricultural vehicle of claim 1, further comprising a display operatively coupled to the controller, the display being configured to receive the drop zone insufficient signal from the controller and present a bale drop zone error responsively to receiving the drop zone insufficient signal.

4. The agricultural vehicle of claim 3, wherein the display is configured to output the at least one bale drop zone input signal to the controller.

5. The agricultural vehicle of claim 1, wherein the communication interface is configured to receive the at least one bale drop zone input signal from another agricultural vehicle or the network.

6. The agricultural vehicle of claim 1, wherein the controller is further configured to define an expected volume of crop material on the field, define a volume of crop material per bale, and determine the number of bales based on the expected volume of crop material and the volume of crop material per bale.

7. The agricultural vehicle of claim 1, wherein the controller is further configured to receive a crop yield signal corresponding to a volume of crop material on the field, define a volume of crop material per bale, and determine the number of bales based on the volume of crop material and the volume of crop material per bale.

8. The agricultural vehicle of claim 7, wherein the controller is configured to receive the crop yield signal from at least one of a baler, a mower-conditioner, a rake, or other yield monitoring equipment.

9. The agricultural vehicle of claim 1, wherein the controller is further configured to receive a bale number signal and define the number of bales based on the received bale number signal.

10. The agricultural vehicle of claim 1, wherein the at least one agricultural vehicle is a baler and the crop material handler comprises a crop collector configured to collect crop material, the baler further comprising a bale chamber configured to form bales from crop material collected by the crop collector.

11. A system for collecting and transporting crop material bales, the system comprising:
    at least one agricultural vehicle, the at least one agricultural vehicle comprising:
    a chassis;
    a crop material handler carried by the chassis and configured to handle crop material;
    a communication interface carried by the chassis and configured to communicate with at least one of another agricultural vehicle or a network; and
    a controller operatively coupled to the communication interface and configured to:
    define a field map corresponding to a field;
    receive at least one bale drop zone input signal;
    define a bale drop zone within the field map based on the received at least one bale drop zone input signal, the bale drop zone defining a location and a bale drop area within the field map;
    determine if the bale drop zone is sufficiently sized for a number of bales formed from crop material on the field to be placed in the bale drop zone; and
    output a drop zone insufficient signal if the bale drop zone is not sufficiently sized for the number of bales to be placed in the bale drop zone.

12. The system of claim 11, further comprising a display operatively coupled to the controller, the display being configured to receive the drop zone insufficient signal from the controller and present a bale drop zone error responsively to receiving the drop zone insufficient signal.

13. The system of claim 12, wherein the display is configured to output the at least one bale drop zone input signal to the controller.

14. The system of claim 11, wherein the communication interface is configured to receive the at least one bale drop zone input signal from another agricultural vehicle or the network.

15. The system of claim 11, wherein the controller is further configured to define an expected volume of crop material on the field, define a volume of crop material per bale, and determine the number of bales based on the expected volume of crop material and the volume of crop material per bale.

16. The system of claim 11, wherein the controller is further configured to receive a crop yield signal corresponding to a volume of crop material on the field, define a volume of crop material per bale, and determine the number of bales based on the volume of crop material and the volume of crop material per bale.

17. The system of claim 16, wherein the controller is configured to receive the crop yield signal from at least one of a baler, a mower-conditioner, a rake, or other yield monitoring equipment.

18. The system of claim 11, wherein the controller is further configured to receive a bale number signal and define the number of bales based on the received bale number signal.

19. The system of claim 11, wherein the at least one agricultural vehicle comprises a baler and the crop material handler comprises a crop collector configured to collect crop material, the baler further comprising a bale chamber configured to form bales from crop material collected by the crop collector.

20. The system of claim 19, wherein the at least one agricultural vehicle further comprises a bale retriever comprising a bale pick up, a retriever communication interface, and a retriever controller operatively coupled to the retriever communication interface and the steering assembly, wherein the controller is configured to output a drop zone set signal corresponding to a sufficiently sized bale drop zone and the retriever controller is configured to receive the drop zone set signal and define the sufficiently sized bale drop zone as a return location.

* * * * *